US012706937B2

(12) United States Patent
Takatsu et al.

(10) Patent No.: US 12,706,937 B2
(45) Date of Patent: Aug. 11, 2026

(54) INFORMATION PROCESSING APPARATUS, INFORMATION PROCESSING METHOD, AND COMPUTER-READABLE RECORDING MEDIUM

(71) Applicant: NTT DOCOMO BUSINESS, Inc., Tokyo (JP)

(72) Inventors: Takeshi Takatsu, Chofu (JP); Mitsuhiro Hatada, Tokyo (JP)

(73) Assignee: NTT DOCOMO BUSINESS, INC., Tokyo (JP)

( * ) Notice: Subject to any disclaimer, the term of this patent is extended or adjusted under 35 U.S.C. 154(b) by 31 days.

(21) Appl. No.: 18/916,754

(22) Filed: Oct. 16, 2024

(65) Prior Publication Data

US 2025/0039211 A1 Jan. 30, 2025

Related U.S. Application Data

(63) Continuation of application No. PCT/JP2023/024530, filed on Jun. 30, 2023.

(30) Foreign Application Priority Data

Mar. 3, 2023 (JP) ................................ 2023-033211

(51) Int. Cl.
*H04L 9/40* (2022.01)

(52) U.S. Cl.
CPC ...... *H04L 63/1425* (2013.01); *H04L 63/1458* (2013.01)

(58) Field of Classification Search
CPC ............ H04L 63/0236; H04L 63/1425; H04L 63/1458
See application file for complete search history.

(56) References Cited

U.S. PATENT DOCUMENTS 10,171,421 B2 * 1/2019 Marshall ............. H04W 12/122
2003/0167410 A1 * 9/2003 Rigstad .................. H04L 63/20 726/1

(Continued)

FOREIGN PATENT DOCUMENTS

CN 111447176 A 7/2020
JP 2012-186519 A 9/2012
JP 7369892 B1 10/2023

OTHER PUBLICATIONS

Lemoudden et al. “Managing Cloud-generated Logs Using Big Data Technologies” [Online], Oct. 10, 2015 [Retrieved on: Jan. 8, 2026], www.ieee.org, Retrieved from: < https://ieeexplore.ieee.org/stamp/stamp.jsp?tp=&arnumber=7381334 > (Year: 2015).*

(Continued)

*Primary Examiner* — Eric W Shepperd
(74) *Attorney, Agent, or Firm* — XSENSUS LLP

(57) ABSTRACT

An information processing apparatus includes processing circuitry configured to acquire a security log including information regarding unauthorized communication stored in an upper network device being a device constituting an overlay network, an authentication log stored in a cloud server, and a communication log stored in a lower network device being a device constituting an underlay network, specify information such that, when the authentication log includes a connection source IP address that does not exist in the communication log acquired and the security log includes information regarding an access not permitted to be used from the connection source IP address, the processing circuitry specifies the information regarding the access as unauthorized communication, and give an instruction to block the unauthorized communication specified.

6 Claims, 8 Drawing Sheets

(56) References Cited

U.S. PATENT DOCUMENTS

| | | | | |
|---|---|---|---|---|
| 2014/0109225 | A1* | 4/2014 | Holloway | H04L 63/1458 726/23 |
| 2016/0234249 | A1* | 8/2016 | Wong | H04L 63/101 |
| 2016/0330219 | A1* | 11/2016 | Hasan | H04L 63/20 |
| 2017/0295207 | A1* | 10/2017 | Yu | H04L 45/54 |
| 2018/0159882 | A1* | 6/2018 | Brill | H04L 63/1425 |
| 2020/0067974 | A1* | 2/2020 | Konda | H04L 63/0263 |
| 2020/0162486 | A1 | 5/2020 | Ranum et al. | |
| 2021/0112091 | A1* | 4/2021 | Compton | H04L 63/1416 |
| 2021/0243208 | A1* | 8/2021 | Rubin | G06F 21/554 |
| 2022/0046059 | A1 | 2/2022 | Pandurangi et al. | |
| 2022/0060491 | A1* | 2/2022 | Achleitner | H04L 63/1425 |
| 2022/0321596 | A1* | 10/2022 | Weizman | H04L 61/4511 |
| 2022/0417287 | A1* | 12/2022 | Joshi | H04L 63/0236 |
| 2023/0291743 | A1* | 9/2023 | Shua | H04L 63/102 |
| 2024/0163261 | A1* | 5/2024 | Crabtree | H04L 9/3239 |

OTHER PUBLICATIONS

Extended European Search Report issued Nov. 26, 2025 in European Patent Application No. 23926373.4, 5 pages.

Office Action issued Sep. 24, 2024 in Japanese Patent Application No. 2023-178287, 10 pages.

Decision to Grant issued Mar. 11, 2025 in Japanese Patent Application No. 2023-178287, 3 pages.

ICT Glossary, "SIEM (Security Information and Event Management)", Available online @ https://www.ntt-west.co.jp/business/glossary/words-00223.html, Jun. 20, 2023, 2 pages including English Translation.

Nikkei Network, "SASE, the security infrastructure of the cloud era", Nov. 28, 2022, 18 pages including English Translation.

Nikkei Computer, "2 Protect apps and devices: The whole story of Zero Trust", May 28, 2020, 6 pages including English Translation.

* cited by examiner

FIG.1

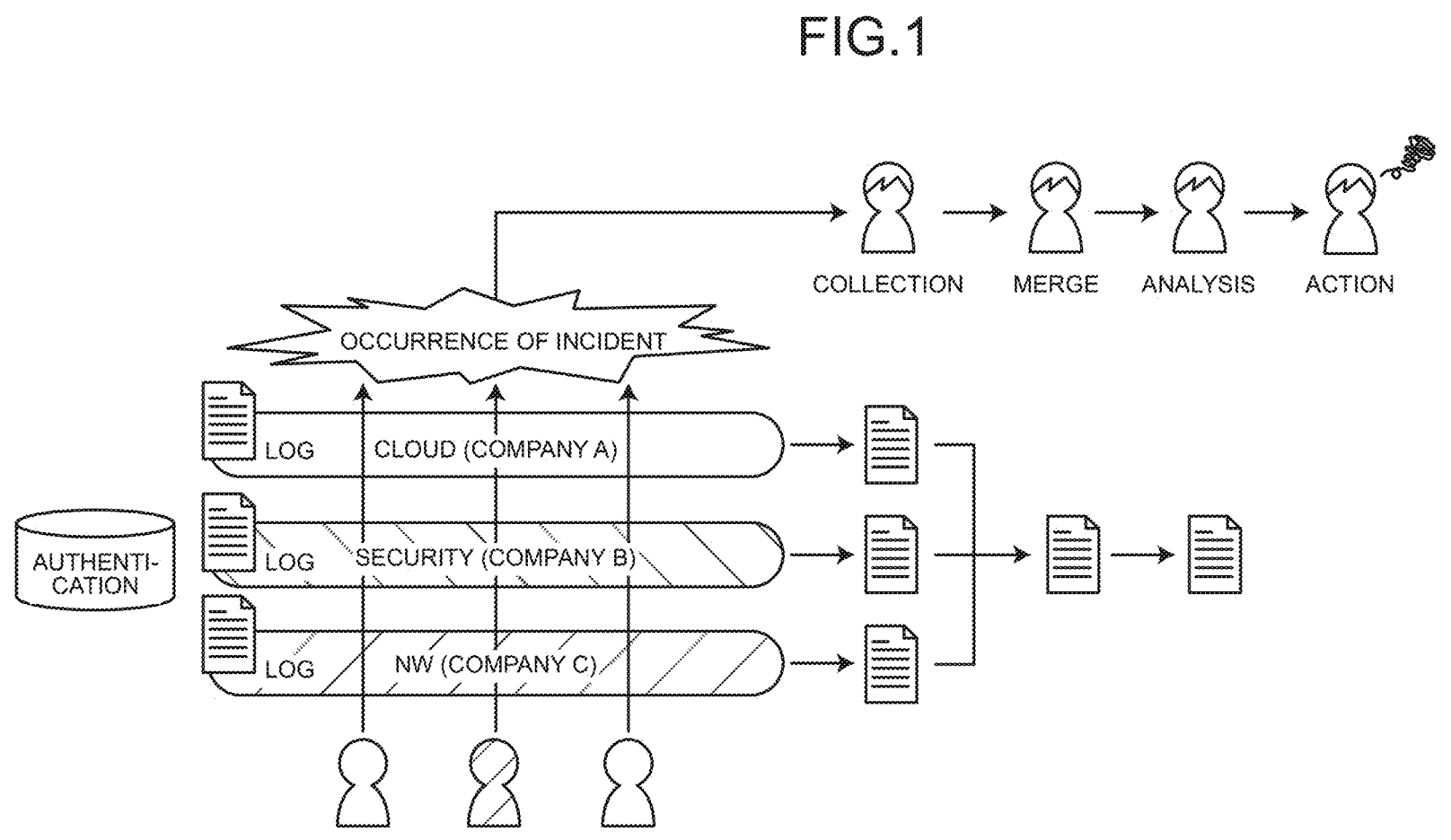

COLLECTION
MERGE
ANALYSIS
ACTION
OCCURRENCE OF INCIDENT
CLOUD (COMPANY A)
SECURITY (COMPANY B)
NW (COMPANY C)
LOG
LOG
LOG
AUTHENTI-
CATION

FIG. 3

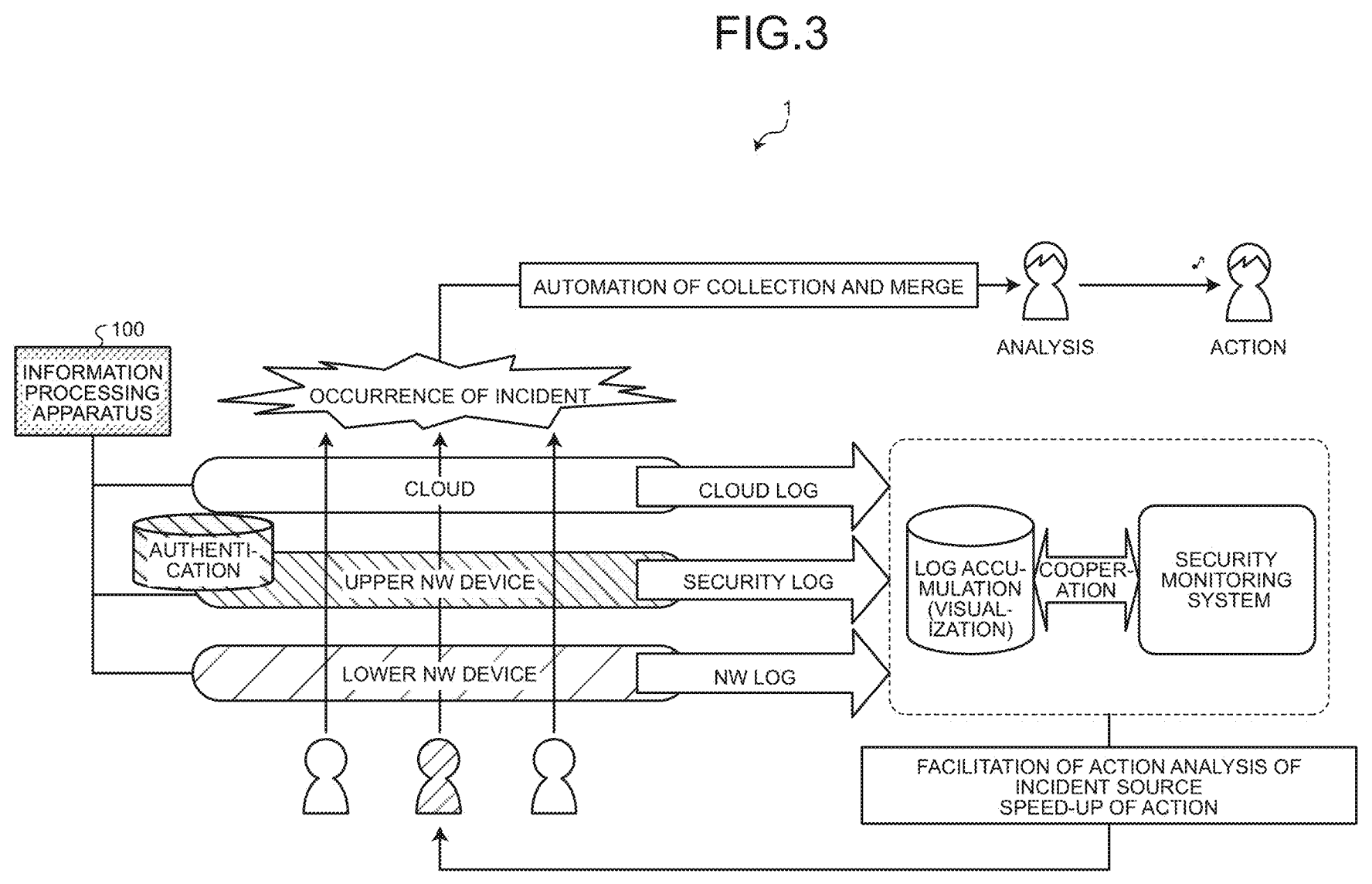

AUTOMATION OF COLLECTION AND MERGE

ANALYSIS

ACTION

OCCURRENCE OF INCIDENT

CLOUD

UPPER NW DEVICE

LOWER NW DEVICE

AUTHENTI-CATION

CLOUD LOG

SECURITY LOG

NW LOG

LOG ACCU-MULATION (VISUAL-IZATION)

COOPER-ATION

SECURITY MONITORING SYSTEM

FACILITATION OF ACTION ANALYSIS OF INCIDENT SOURCE SPEED-UP OF ACTION

100

INFORMATION PROCESSING APPARATUS

| DATE/TIME | CONNECTION DESTINATION IP: Port | CONNECTION SOURCE IP: Port | PROTOCOL | NUMBER OF BYTES TRANSFERRED |
|---|---|---|---|---|
| 2023/1/23 9:17:24 | 203.0.113.88:443 | 192.0.2.72:13528 | TCP | 60 |
| 2023/1/23 10:42:5 | 203.0.113.56:443 | 192.0.2.72:13793 | TCP | 1200 |
| ⋮ | ⋮ | ⋮ | ⋮ | ⋮ |
| 2023/1/23 17:31:56 | 203.0.113.61:443 | 192.0.2.72:18582 | TCP | 380 |

(2)

| DETECTION DATE/TIME | DETECTION TYPE | CONNECTION DESTINATION IP: Port | CONNECTION SOURCE IP: Port |
|---|---|---|---|
| 2023/1/23 17:59:38 | STORAGE SERVICE ACCESS | 203.0.113.111:443 | 192.0.2.222:11663 |

(3)

| DATE/TIME | ID | CONNECTION SOURCE IP: Port | AUTHENTICATION RESULT |
|---|---|---|---|
| 2023/1/23 10:42:5 | 1234567 | 192.0.2.72:13793 | PERMITTED |
| ⋮ | ⋮ | ⋮ | ⋮ |
| 2023/1/23 17:59:30 | 1234567 | 192.0.2.222:11552 | PERMITTED |

(4)

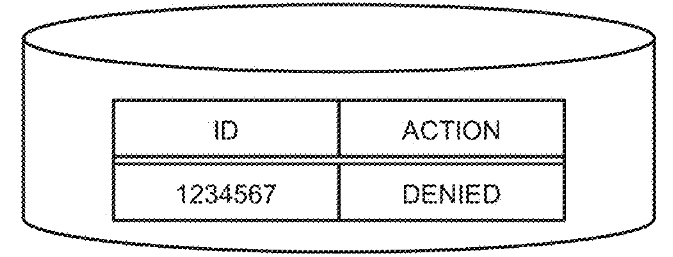

| ID | ACTION |
|---|---|
| 1234567 | DENIED |

FIG.5

(1) SECURITY LOG

| DETECTION DATE/TIME | DETECTION TYPE | CONNECTION DESTINATION IP: Port | CONNECTION SOURCE IP: Port |
|---|---|---|---|
| 2023/1/23 17:59:38 | STORAGE SERVICE ACCESS | 203.0.113.111:443 | 192.0.2.222:11663 |

COMPARISON

COMPARISON (2) COMMUNICATION LOG

| DATE/TIME | CONNECTION DESTINATION IP: Port | CONNECTION SOURCE IP: Port | PROTOCOL | NUMBER OF BYTES TRANSFERRED |
|---|---|---|---|---|
| 2023/1/23 9:17:24 | 203.0.113.88:443 | 192.0.2.72:13528 | TCP | 60 |
| 2023/1/23 10:42:5 | 203.0.113.56:443 | 192.0.2.72:13793 | TCP | 1200 |
| ⋮ | ⋮ | ⋮ | ⋮ | ⋮ |
| 2023/1/23 17:31:56 | 203.0.113.61:443 | 192.0.2.72:18582 | TCP | 380 |

(3) AUTHENTICATION LOG

| DATE/TIME | ID | CONNECTION SOURCE IP: Port | AUTHENTICATION RESULT |
|---|---|---|---|
| 2023/1/23 10:42:5 | 1234567 | 192.0.2.72:13793 | PERMITTED |
| ⋮ | ⋮ | ⋮ | ⋮ |
| 2023/1/23 17:59:38 | 1234567 | 192.0.2.222:11552 | PERMITTED |

| DATE/TIME | CONNECTION DESTINATION IP: Port | CONNECTION SOURCE IP: Port | PROTOCOL | NUMBER OF BYTES TRANSFERRED |
|---|---|---|---|---|
| 2023/1/23 9:17:24 | 203.0.113.88:443 | 192.0.2.72:13528 | TCP | 60 |
| 2023/1/23 10:42:5 | 203.0.113.56:443 | 192.0.2.72:13793 | TCP | 1200 |
| ⋮ | ⋮ | ⋮ | ⋮ | ⋮ |
| 2023/1/23 17:31:56 | 203.0.113.61:443 | 192.0.2.72:18582 | TCP | 380 |

(2)

| DETECTION DATE/TIME | DETECTION TYPE | CONNECTION DESTINATION IP: Port | CONNECTION SOURCE IP: Port |
|---|---|---|---|
| **2023/1/23 17:59:38** | STORAGE SERVICE ACCESS | 203.0.113.111:443 | **192.0.2.222** 11663 |

(3)

| DATE/TIME | ID | CONNECTION SOURCE IP: Port | AUTHENTICATION RESULT |
|---|---|---|---|
| 2023/1/23 10:42:5 | 1234567 | 192.0.2.72:13793 | PERMITTED |
| ⋮ | ⋮ | ⋮ | ⋮ |
| **2023/1/23 17:59:30** | **1234567** | **192.0.2.222** 11552 | PERMITTED |

(4)

| ID | ACTION |
|---|---|
| 1234567 | DENIED |

(5)

| ID | CONNECTION SOURCE IP | COMMUNICATION | AUTHENTICATION | SECURITY |
|---|---|---|---|---|
| 1234567 | 192.0.2.222 | | 2023/1/23 17:59:30 | 2023/1/23 17:59:38 |

INFORMATION PROCESSING APPARATUS, INFORMATION PROCESSING METHOD, AND COMPUTER-READABLE RECORDING MEDIUM

CROSS-REFERENCE TO RELATED APPLICATIONS

This application is a continuation application of International Application No. PCT/JP2023/024530, filed on Jun. 30, 2023 which claims the benefit of priority of the prior Japanese Patent Application No. 2023-033211, filed on Mar. 3, 2023, the entire contents of each are incorporated herein by reference.

FIELD

The present invention relates to an information processing apparatus, an information processing method, and an information processing program.

BACKGROUND

Conventionally, incident management using log information has been performed. For example, log information is analyzed to grasp the damage situation from information such as the source of the incident, the communication destination, and the authentication history.

The related technique has a problem of a difficulty in quickly handling an incident while suppressing cost. For example, due to the need to perform analysis by matching a plurality of pieces of log information, a large amount of labor and time are required for the analysis. In addition, there is a case of taking measures disregarding the cost in order to solve the problem at an earlier stage.

The present invention has been made in view of the above, and aims to provide an information processing apparatus, an information processing method, and an information processing program capable of achieving quick incident handling and cost reduction.

SUMMARY

It is an object of the present invention to at least partially solve the problems in the related technology.

According to an aspect of the embodiments, an information processing apparatus includes: processing circuitry configured to: acquire a security log including information regarding unauthorized communication stored in an upper network device being a device constituting an overlay network, an authentication log stored in a cloud server, and a communication log stored in a lower network device being a device constituting an underlay network; specify information such that, when the authentication log includes a connection source internet protocol (IP) address that does not exist in the communication log acquired and the security log includes information regarding an access not permitted to be used from the connection source IP address, the processing circuitry specifies the information regarding the access as unauthorized communication; and give an instruction to block the unauthorized communication specified.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 1 is a diagram for illustrating a related technique;

FIG. 3 is a diagram for illustrating an overview of processing performed by the information processing apparatus according to the embodiment;

FIG. 4 is a diagram for illustrating an overview of processing performed by the information processing apparatus according to the embodiment;

FIG. 5 is a diagram for illustrating an overview of processing performed by the information processing apparatus according to the embodiment;

FIG. 6 is a diagram for illustrating an overview of processing performed by the information processing apparatus according to the embodiment;

DESCRIPTION OF EMBODIMENTS

Figure 2:
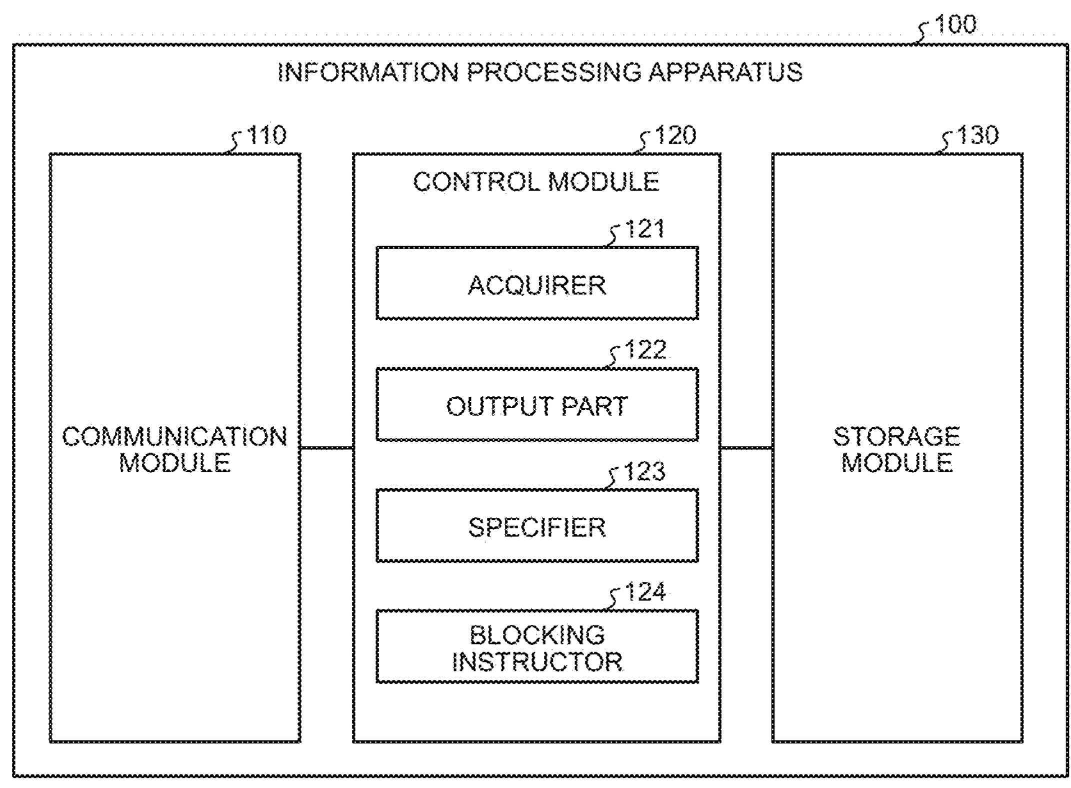
FIG. 2 is a diagram illustrating an example of a configuration of an information processing apparatus according to an embodiment.

Hereinafter, embodiments of an information processing apparatus, an information processing method, and an information processing program according to the present application will be described in detail with reference to the drawings. Note that the present invention is not limited by the embodiment. In the description of the drawings, the same portions are denoted by the same reference numerals, and redundant description is omitted.

Related Technique

First, a related technique will be described with reference to FIG. 1. FIG. 1 is a diagram for illustrating a related technique. In the following, a device constituting an overlay network will be denoted as an upper network (NW) device, while a device constituting an underlay network will be denoted as a lower NW device. Here, the upper NW device refers to, for example, a cloud proxy server or Unified Threat Management (UTM) equipment. The lower NW device refers to, for example, a network device such as Deep Packet Inspection (DPI) equipment, a router, and a switch.

In the conventional security countermeasures, networks are divided into a reliable "inside" and an unreliable "outside", and countermeasures are taken at the boundary. An example of the inside network is a data center connected by an in-house local area network (LAN) or a virtual private network (VPN), and an example of the outside network is the Internet. For example, as a countermeasure taken at the boundary, security equipment such as a firewall, a proxy, or an Intrusion Detection System (IDS)/Intrusion Prevention System (IPS) is installed at the boundary to monitor and control the communication, thereby blocking a cyberattack from the outside.

Such prior security measures assume that data and systems to be protected are inside the network. However, with the spread of the cloud, it is not unusual that there is a target to be protected on the Internet on the outside. In this manner, the targets to be protected are scattered in various locations to blur the boundary, making it difficult to take sufficient measures with a conventional mindset.

In view of this circumstance, the concept of zero trust is spreading. In the zero trust security service, various security countermeasures are taken on the assumption that all communications are not to be trusted. Specific examples of this include enhancement of user authentication by encryption of a communication path regardless of the inside and outside of the network, use of multi-factor authentication, and the like, and integrated log monitoring of the network and various devices connected to the network. A large number of security solutions for implementing the zero trust have already emerged. For example, there has been provided a solution such as Endpoint Detection and Response (EDR) that enables quick detection and handling of a cyberattack by monitoring a client device and analyzing a log.

Under such circumstances, incident management using log information has been conventionally performed. For example, log information is analyzed to grasp the damage situation from information such as the source of the incident, the communication destination, and the authentication history.

However, the related technique has a problem of a difficulty in quickly handling an incident while suppressing cost. For example, when an incident occurs, there is a need to collect individual pieces of log information such as an occurrence source, a communication destination, and an authentication history stored in the upper NW device, the lower NW device, or the like, and accurately grasp a damage situation caused by the incident. However, it is necessary to perform analysis by matching pieces of log information in which information is not integrated by a device unit, an identification (ID) unit, or the like, which requires a lot of labor and time. In addition, there is a case of taking measures disregarding the cost in order to solve the problem at an early stage.

In view of this situation, an information processing apparatus 100 according to an embodiment includes: an acquirer 121 that acquires a security log including information regarding unauthorized communication (for example, malicious communication) stored in an upper NW device being a device constituting an overlay network, an authentication log stored in a cloud server, and a communication log stored in a lower NW device being a device constituting an underlay network; a specifier 123 that specifies information such that, when an authentication log includes a connection source IP address that does not exist in the communication log acquired by the acquirer 121 and a security log includes information regarding an access not permitted to be used from the connection source IP address, the specifier 123 specifies the information regarding the access as unauthorized communication; and a blocking instructor 124 that gives an instruction to block the unauthorized communication specified by the specifier 123.

With such a configuration, it is possible to have effects such as quick incident handling and cost reduction.

Furthermore, an information processing system 1 being a system including the information processing apparatus 100 provides a zero trust security service unique to a provider (carrier). The zero trust security uses a configuration in which the underlay NW and the overlay NW cooperate to perform protection in an Information and Communication Technology (ICT) environment with increased complexity and cyber risk by new ways of working such as working remote and new business expansion by utilization of Internet of Things (IoT) and the like.

The information processing system 1 provides a secure Network as a Service (NaaS) type ICT service closely linking the function of the overlay NW and the function of the underlay NW. A company that receives the service of the information processing system 1 can easily start, revise, and cancel the service of the information processing system 1 immediately by applying from a management portal site without spending a cost for Information Technology (IT) vendor outsourcing or spending a cost for NW design, making it possible to reduce operational cost taken from design to application.

Regarding the information processing system 1, the overlay NW and the underlay NW are provided by the same provider. In addition, the user who uses the information processing system 1 can perform flexible use of the system, for example, using only the overlay NW of this system and using another company for the underlay NW.

Configuration of Information Processing Apparatus

Next, a configuration of the information processing apparatus 100 will be described with reference to FIG. 2. As illustrated in FIG. 2, the information processing apparatus 100 includes a communication module 110, a control module 120, and a storage module 130. Note that these modules may be held by a plurality of devices in a distributed manner. Hereinafter, processing of these modules will be described.

The communication module 110 is implemented by a Network Interface Card (NIC) or the like, and enables communication between the control module 120 and an external device via a telecommunications link such as a LAN or the Internet. For example, the communication module 110 enables communication between the control module 120 and the upper NW device or the lower NW device.

The storage module 130 is implemented by a semiconductor memory element such as Random Access Memory (RAN) or flash memory, or a storage device such as a hard disk or an optical disk. The information stored in the storage module 130 includes, for example: information related to authentication (hereinafter, denoted as "authentication log" or "cloud log" as appropriate), information related to security (hereinafter, denoted as "security log" as appropriate), information related to communication (hereinafter, denoted as "communication log" or "NW log" as appropriate), information related to unauthorized communication, information regarding the upper NW device, information regarding the lower NW device, other information necessary for specifying unauthorized communication, and other information necessary for blocking unauthorized communication.

Here, the security log is, for example, a log related to unauthorized communication detected by the upper NW device. The authentication log is, for example, a log related to an authentication request received by the cloud server. The communication log is, for example, flow data of each network device being a lower NW device.

Furthermore, the information related to authentication includes, for example, information such as date/time when authentication is requested, an ID, a connection source IP address/port, and an authentication result. Furthermore, the information related to the security includes, for example, information such as a detection date/time, a detection type, a connection destination IP address/port, and a connection source IP address/port of suspicious communication suspected as unauthorized communication detected by the cloud proxy.

Furthermore, the information related to communication includes, for example, information such as a date/time of each communication, a connection destination IP address/port, a connection source IP address/port, a protocol, and the number of bytes transferred. Note that the information stored in the storage module 130 is not limited to the example described above.

The control module 120 is implemented by using a Central Processing Unit (CPU), a Network Processor (NP), a Field Programmable Gate Array (FPGA), or the like, and executes a processing program stored in the memory. As illustrated in FIG. 2, the control module 120 includes an acquirer 121, an output part 122, a specifier 123, and a blocking instructor 124. Hereinafter, each part included in the control module 120 will be described.

The acquirer 121 acquires a security log being information regarding unauthorized communication stored in the upper NW device, an authentication log stored in the cloud server, and a communication log stored in the lower NW device. For example, the acquirer 121 acquires information such as a detection date/time, a detection type, a connection destination IP address/port, and a connection source IP address/port as the security log stored in the upper NW device, acquires information such as a date/time, an ID, a connection source IP address/port, and an authentication result as the authentication log stored in the cloud server, and acquires information such as a date/time, a connection destination IP address/port, a connection source IP address/port, a protocol, and the number of bytes transferred as the communication log stored in the lower NW device.

The output part 122 outputs information obtained by matching the security log, the authentication log, and the communication log acquired by the acquirer 121. For example, the output part 122 performs matching of the information related to authentication, the information related to security, and the information related to communication acquired by the acquirer 121 for each terminal or for each identification information.

The specifier 123 specifies unauthorized communication by using the information related to authentication, the information related to security, and the information related to communication, which have been acquired by the acquirer 121. For example, when an IP address that does not exist in the information related to communication exists in the information related to authentication and when information related to security includes information regarding an access from the IP address not permitted to access, the specifier 123 specifies the information regarding the access as unauthorized communication. Here, "not permitted" means that having not been set as an IP address permitted to access.

For example, when the IP address "192.0.2.222", which does not exist in the information related to communication out of the information acquired by the acquirer 121, exists in the information related to authentication, and when the information related to security includes information regarding an access from the IP address "192.0.2.222" not permitted to access, the specifier 123 specifies the information regarding the access as unauthorized communication.

For example, the specifier 123 compares a connection source IP address included in the security log with a connection source IP address included in the communication log, and determines whether the communication log includes log information in which a connection source IP address and a connection source IP address included in the security log are the same. In addition, the specifier 123 compares the connection source IP address included in the security log with a connection source IP address included in the authentication log, and determines whether the authentication log includes log information in which the connection source IP address and the connection source IP address included in the security log are the same. When having determined that the connection log includes no log information in which a connection source IP address and a connection source IP address included in the security log are the same, and the authentication log includes log information in which a connection source IP address and a connection source IP address included in the security log are the same, the specifier 123 specifies the log information of the connection source IP address included in the security log as unauthorized communication.

More specifically, for example, the specifier 123 first compares a connection source IP address included in the security log with information regarding a connection source IP address included in the communication log, and determines whether the communication log includes log information in which a connection source IP address "192.0.2.222" and a connection source IP address included in the security log are the same.

Subsequently, the specifier 123 compares the connection source IP address included in the security log with information regarding the connection source IP address included in the authentication log, and determines whether the authentication log includes log information in which the connection source IP address "192.0.2.222" and the connection source IP address included in the security log are the same.

As a result, when having determined that the communication log includes no log information containing a same source IP address as "192.0.2.222" included in the security log, and determined that the authentication log includes log information containing a same source IP address as "192.0.2.222" included in the security log, the specifier 123 specifies the log information of a source IP address "192.0.2.222" included in the security log, specifically, "Detection date/time: 2023/1/23 17:59:38, Detection type: Storage service access, Connection destination IP: Port: 203.0.113.111:443, Connection source IP: Port: 192.0.2.222:11663", as unauthorized communication.

The blocking instructor 124 gives an instruction to block the unauthorized communication specified by the specifier 123. For example, the blocking instructor 124 gives an instruction to block unauthorized communication by using identification information associated with the unauthorized communication specified by the specifier 123. For example, the blocking instructor 124 blocks the unauthorized communication by instructing an external device (such as the upper NW device) to block communication in which an account indicated by identification information (ID) "1234567" associated with unauthorized communication specified by the specifier 123 is a communication destination or a communication source.

In addition, for example, the blocking instructor 124 may give an instruction to block the unauthorized communication by using the information regarding the IP address of the unauthorized communication specified by the specifier 123. More specifically, the blocking instructor 124 may instruct the upper NW device to block the communication to the connection destination IP address "203.0.113.111" of the unauthorized communication specified by the specifier 123. Furthermore, for example, the blocking instructor 124 may instruct the upper NW device to block the communication from connection source IP address "192.0.2.222" of the unauthorized communication specified by the specifier 123.

Outline of Processing Performed by Information Processing Apparatus

Next, processing performed by the information processing apparatus 100 will be described with reference to FIGS.

3 to 5. FIGS. 3 to 5 are diagrams for illustrating an outline of processing performed by the information processing apparatus 100.

The acquirer 121 acquires a security log being information regarding unauthorized communication stored in the upper NW device, an authentication log stored in the cloud server, and a communication log stored in the lower NW device. In the example of FIG. 3, the acquirer 121 acquires a security log, an authentication log (cloud log), and a communication log (NW log). Here, the security log is a log of information detected by a cloud proxy or the like of the upper NW device (for example, suspicious communication such as access to an external storage service from an unauthorized IP address), and includes information such as a detection date/time, a detection type, a connection destination IP: Port, and a connection source IP: Port. The authentication log is a log of authentication information, and includes information such as date/time, ID, connection source IP: Port, and an authentication result. The communication log is a communication log of the underlay NW, and includes information such as date/time, connection destination IP: Port, connection source IP: Port, a protocol, and the number of bytes transferred. In the example of FIG. 4, FIG. 4(1) corresponds to the communication log, FIG. 4(2) corresponds to the security log, and FIG. 4(3) corresponds to the cloud log.

Subsequently, the output part 122 performs matching of pieces of information regarding the cloud log, the security log, and the NW log acquired by the acquirer 121 and outputs the result. For example, the output part 122 displays the information regarding the cloud log, the security log, and the NW log that has undergone matching for each IP address or identification information.

Furthermore, the information processing apparatus 100 uses each piece of information to specify/block unauthorized communication. In the example of FIG. 4, when the IP address "192.0.2.222" that does not exist in the communication log (FIG. 4(1)) as the information related to communication exists in the authentication log (FIG. 4(3)) as the information related to authentication, and when the information regarding the access from the IP address "192.0.2.222" not permitted to access exists in the security log (FIG. 4(2)) as the information related to security, the specifier 123 suspects that the case is an unauthorized login and specifies the information regarding the access as unauthorized communication.

Subsequently, specification of unauthorized communication by the specifier 123 will be described with reference to FIG. 5. FIG. 5(1) illustrates information recorded in the security log. FIG. 5(2) illustrates information recorded in the communication log. FIG. 5(3) illustrates information recorded in the authentication log.

For example, the specifier 123 first compares the security log with the communication log, and determines whether there is a communication log in which a connection source IP address and a connection source IP address included in the security log are the same. More specifically, the specifier 123 compares the connection source IP address included in the security log illustrated in FIG. 5(1) with the information regarding the connection source IP address included in the communication log illustrated in FIG. 5(2), and determines that communication in which the connection source IP address "192.0.2.222" and the connection source IP address included in the security log are the same does not exist in the communication log within a certain period from the detection date/time "2023/1/23 17:59:38" of the detected security log information.

Subsequently, the specifier 123 compares the security log with the authentication log, and determines whether there is an authentication log in which a connection source IP address and a connection source IP address included in the security log are the same. More specifically, the specifier 123 compares the connection source IP address included in the security log illustrated in FIG. 5(1) with the information regarding the connection source IP address included in the authentication log illustrated in FIG. 5(3), and determines that communication in which the connection source IP address "192.0.2.222" and the connection source IP address included in the security log are the same exists in the authentication log within a certain period from the detection date/time "2023/1/23 17:59:38" of the detected security log information.

When a communication having the same connection source IP address as the detected security log does not exist in the communication log but exists in the authentication log, the specifier 123 specifies the detected information as unauthorized communication. More specifically, based on the fact that the log information same as connection source IP address "192.0.2.222" included in the security log illustrated in FIG. 5(1) does not exist in the communication log illustrated in FIG. 5(2) but exists in the security log illustrated in FIG. 5(3), the specifier 123 specifies the log information of connection source IP address "192.0.2.222" included in the security log illustrated in FIG. 5(1), namely, "Detection date/time: 2023/1/23 17:59:38, Detection type: Storage service access, Connection destination IP: Port: 203.0.113.111:443, Connection source IP: Port: 192.0.2.222:11663", as unauthorized communication.

The description returns to FIG. 4 again. The blocking instructor 124 sets the upper NW device not to permit authentication from an ID associated with the unauthorized communication specified by the specifier 123, thereby instructing the upper NW device to freeze the ID and block unauthorized communication. More specifically, as illustrated in FIG. 4(4), the blocking instructor 124 sets the upper NW device not to permit authentication from ID "1234567" associated with the unauthorized communication specified by the specifier 123, thereby freezing the ID and giving an instruction on the blocking of the unauthorized communication.

In this manner, when there is an authentication log of a communication coming from a different connection source IP address such as an external NW and not existing in the communication log of the underlay NW, and when the upper NW device in the overlay NW has detected access to the external storage service not permitted to access from the connection source IP address, the information processing apparatus 100 suspects that the case is an unauthorized login from a location different from the underlay NW, and locks the account.

At this time, as an instruction to block unauthorized communication, in addition to freezing of the ID, the blocking instructor 124 may also give an instruction to block unauthorized communication by using information regarding an IP address of the unauthorized communication specified by the specifier 123. More specifically, the blocking instructor 124 instructs the upper NW device to block the communication of unauthorized communication to connection destination IP address "203.0.113.111" specified by the specifier 123, thereby instructing the upper NW device to block unauthorized communication. Furthermore, for example, the blocking instructor 124 instructs the upper NW device to block communication from connection source IP address "192.0.2.222" of the unauthorized communication specified by the specifier 123, thereby instructing the upper NW device to block the unauthorized communication.

Here, the matching processing performed by the output part 122 will be described with reference to FIG. 6. FIG. 6 illustrates matching between the authentication log and the security log. FIGS. 6(1) to 6(4) are the same as FIGS. 4(1) to 4(4), respectively. Referring to the example of FIG. 6, for example, the output part 122 acquires Connection source IP address (denoted as "connection source IP" in FIG. 6) "192.0.2.222" related to the unauthorized communication included in the security log (FIG. 6(2)) and Detection date/time "2023/1/23 17:59:38", and performs matching with information of the authentication log (FIG. 6(3)) using the connection source IP address "192.0.2.222" as a key. Subsequently, as a result of the matching, the output part 122 extracts information regarding ID "1234567" corresponding to the connection source IP address "192.0.2.222" included in the authentication log, and the authentication date/time "2023/1/23 17:59:30" at which the authentication has been performed.

As illustrated in FIG. 6(5), the output part 122 then collectively outputs the extracted information, including ID "1234567", the connection source IP address "192.0.2.222", the authentication date/time (denoted as "authentication" in FIG. 6) "2023/1/23 17:59:30", and the detection date/time (denoted as "security" in FIG. 6) "2023/1/23 17:59:38", as one record. That is, by outputting the information that has undergone the matching performed by the processing described above, the output part 122 can output information that can be confirmed by comparing the detection result of the unauthorized communication in the security log with the authentication result in the authentication log, making it possible to reduce the burden on the system administrator when analyzing the cause of the incident, leading to achievement of quick incident handling and cost reduction.

Flowchart

Figure 7:
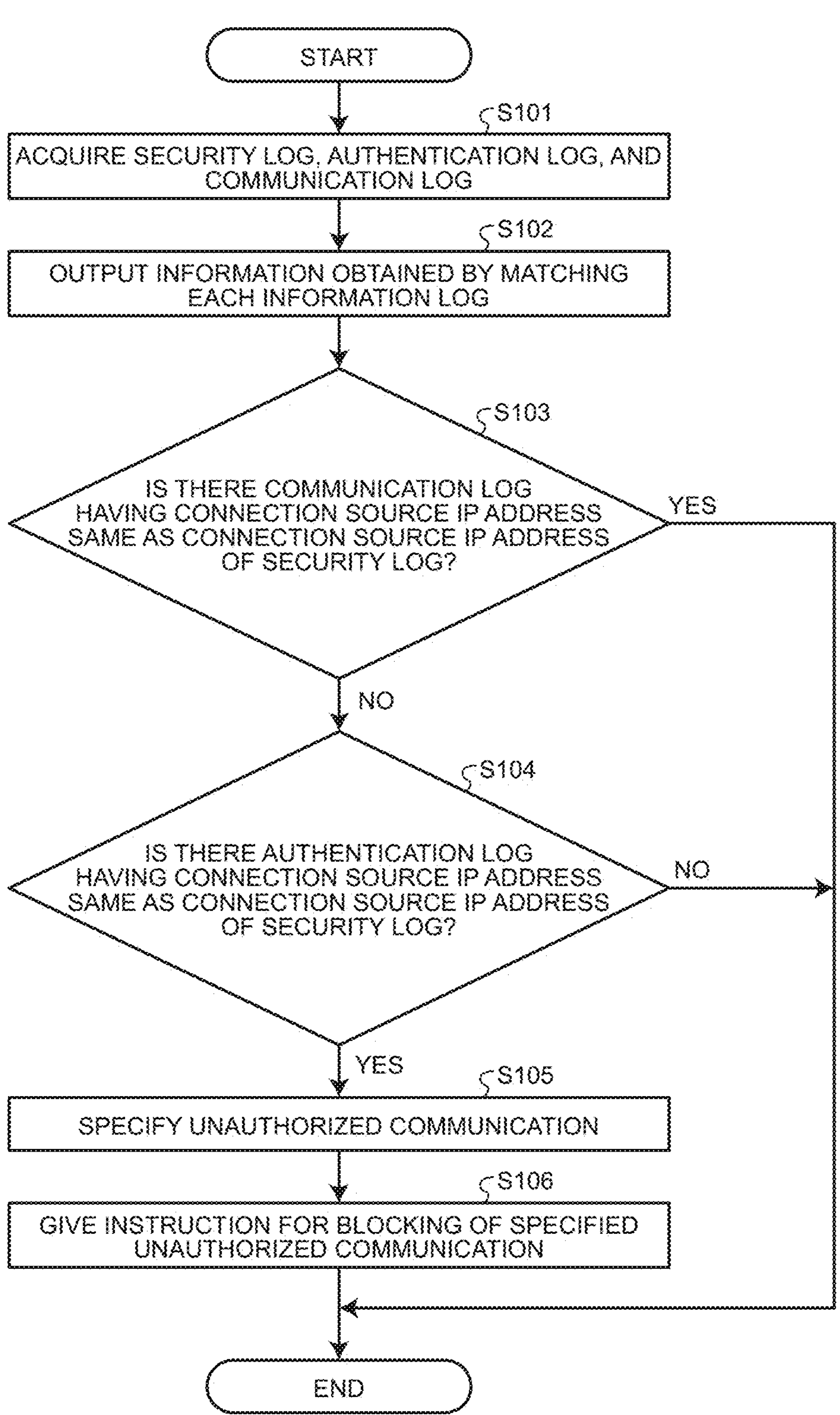
FIG. 7 is a flowchart illustrating an example of a flow of processing performed by the information processing apparatus according to the embodiment.

Next, a flow of processing performed by the information processing apparatus 100 will be described with reference to FIG. 7. Note that the following steps can be executed in different orders, and may include processing to be omitted.

First, the acquirer 121 acquires a security log being information regarding unauthorized communication stored in the upper NW device, an authentication log stored in the cloud server, and a communication log stored in the lower NW device (Step S101). For example, the acquirer 121 acquires information such as a detection date/time, a detection type, a connection destination IP address/port, and a connection source IP address/port as the security log stored in the upper NW device, acquires information such as a date/time, an ID, a connection source IP address/port, and an authentication result as the authentication log stored in the cloud server, and acquires information such as a date/time, a connection destination IP address/port, a connection source IP address/port, a protocol, and the number of bytes transferred as the communication log stored in the lower NW device.

Next, the output part 122 outputs information obtained by matching the information related to authentication, the information related to security, and the information related to communication, which have been acquired by the acquirer 121 (Step S102). For example, the output part 122 performs matching of the information related to authentication, the information related to security, and the information related to communication acquired by the acquirer 121 for each identification information.

Subsequently, the specifier 123 determines whether there is a communication log having a connection source IP address same as the connection source IP address of the security log (Step S103). Here, when the specifier 123 determines that there is a communication log having the connection source IP address same as the connection source IP address of the security log (Step S103 "YES"), the information processing apparatus 100 ends the processing.

In contrast, when the specifier 123 determines that there is no communication log having the connection source IP address same as the connection source IP address of the security log (Step S103 "NO"), the specifier 123 determines whether there is an authentication log having the connection source IP address same as the connection source IP address of the security log (Step S104).

Here, when the specifier 123 determines that there is no authentication log in which the connection source IP address and the connection source IP address of the security log are the same (Step S104 "NO"), the information processing apparatus 100 ends the processing. In contrast, when the specifier 123 determines that there is an authentication log in which the connection source IP address and the connection source IP address of the security log are the same (Step S104 "YES"), the specifier 123 determines that the authentication log includes a connection source IP address not existing in the communication log acquired by the acquirer 121 and determines that the security log includes information regarding an access that is not permitted to be used from the connection source IP address, and then specifies the information regarding the access as unauthorized communication (Step S105).

Subsequently, the blocking instructor 124 gives an instruction to block the unauthorized communication specified by the specifier 123 (Step S106). For example, the blocking instructor 124 gives an instruction to block unauthorized communication by using identification information included in the unauthorized communication specified by the specifier 123.

Effects

The information processing apparatus 100 according to the embodiment includes: the acquirer 121 that acquires a security log including information regarding unauthorized communication stored in the upper NW device being a device constituting an overlay network, an authentication log stored in the cloud server, and a communication log stored in the lower NW device being a device constituting the underlay network; the specifier 123 that specifies information such that, when the authentication log includes a connection source IP address that does not exist in the communication log acquired by the acquirer 121 and the security log includes information regarding an access not permitted to be used from the connection source IP address, the specifier 123 specifies the information regarding the access as unauthorized communication; and the blocking instructor 124 that gives an instruction to block the unauthorized communication specified by the specifier 123.

Since the information processing apparatus 100 uses this configuration to collect and merge individual pieces of information, making it possible to quickly grasp the communication destination in units of ID and IP address even at occurrence of an incident, leading to dramatical enhancement of the accuracy of investigation of the cause and the response speed in handling and countermeasures. In addition, human cost required for incident handling is greatly reduced.

Furthermore, in a case where there is access information suspected of unauthorized login in the collected and merged information, the information processing apparatus 100 specifies and blocks the communication as unauthorized communication. This reduces time and effort required for analyzing each piece of information and examining an action for an analysis result, leading to achievement of quick handling of an incident and cost reduction.

The specifier 123 of the information processing apparatus 100 according to the embodiment compares a connection source IP address included in the security log with a connection source IP address included in the communication log, and determines whether the communication log includes log information in which a connection source IP address and a connection source IP address included in the security log are the same. In addition, the specifier 123 compares the connection source IP address included in the security log with a connection source IP address included in the authentication log, and determines whether the authentication log includes log information in which the connection source IP address and the connection source IP address included in the security log are the same. When the connection log includes no log information in which a connection source IP address and a connection source IP address included in the security log are the same, and the authentication log includes log information in which a connection source IP address and a connection source IP address included in the security log are the same, the specifier 123 specifies the log information of the connection source IP address included in the security log as unauthorized communication.

With this configuration, when there is access information suspected of unauthorized login in the collected and merged information, the information processing apparatus 100 determines whether information regarding a connection source IP address of the access information exists in the communication log or the authentication log. In a case where the access information exists only in the authentication log, the information processing apparatus 100 specifies the access information as unauthorized communication and blocks the communication. This reduces time and effort required for analyzing each information and examining an action for an analysis result, leading to achievement of quick handling of an incident and cost reduction.

The information processing apparatus 100 according to the embodiment includes the output part 122 that outputs information obtained by matching the logs acquired by the acquirer 121, namely, the security log, the authentication log, and the communication log.

With this configuration, the information processing apparatus 100 outputs information that is collected from each device and has undergone matching, making it possible to reduce the burden on the system administrator in analyzing the cause of the incident, leading to quick handling of the incident and cost reduction.

The blocking instructor 124 of the information processing apparatus 100 according to the embodiment gives an instruction to block unauthorized communication by using the identification information included in the unauthorized communication specified by the specifier 123.

With this configuration, the information processing apparatus 100 takes measures such as not permitting authentication from an ID of unauthorized communication, leading to achievement of quick handling of the incident and cost reduction.

Program

It is also possible to create a program in which the processing executed by the information processing apparatus 100 in the above embodiment is described in a language executable by a computer. In this case, by execution of the program by the computer, effects similar to those of the above embodiment can be obtained. Furthermore, the program may be recorded in a computer-readable recording medium, and the program recorded in the recording medium may be read and executed by the computer to implement processing similar to the above-described embodiment.

Figure 8:
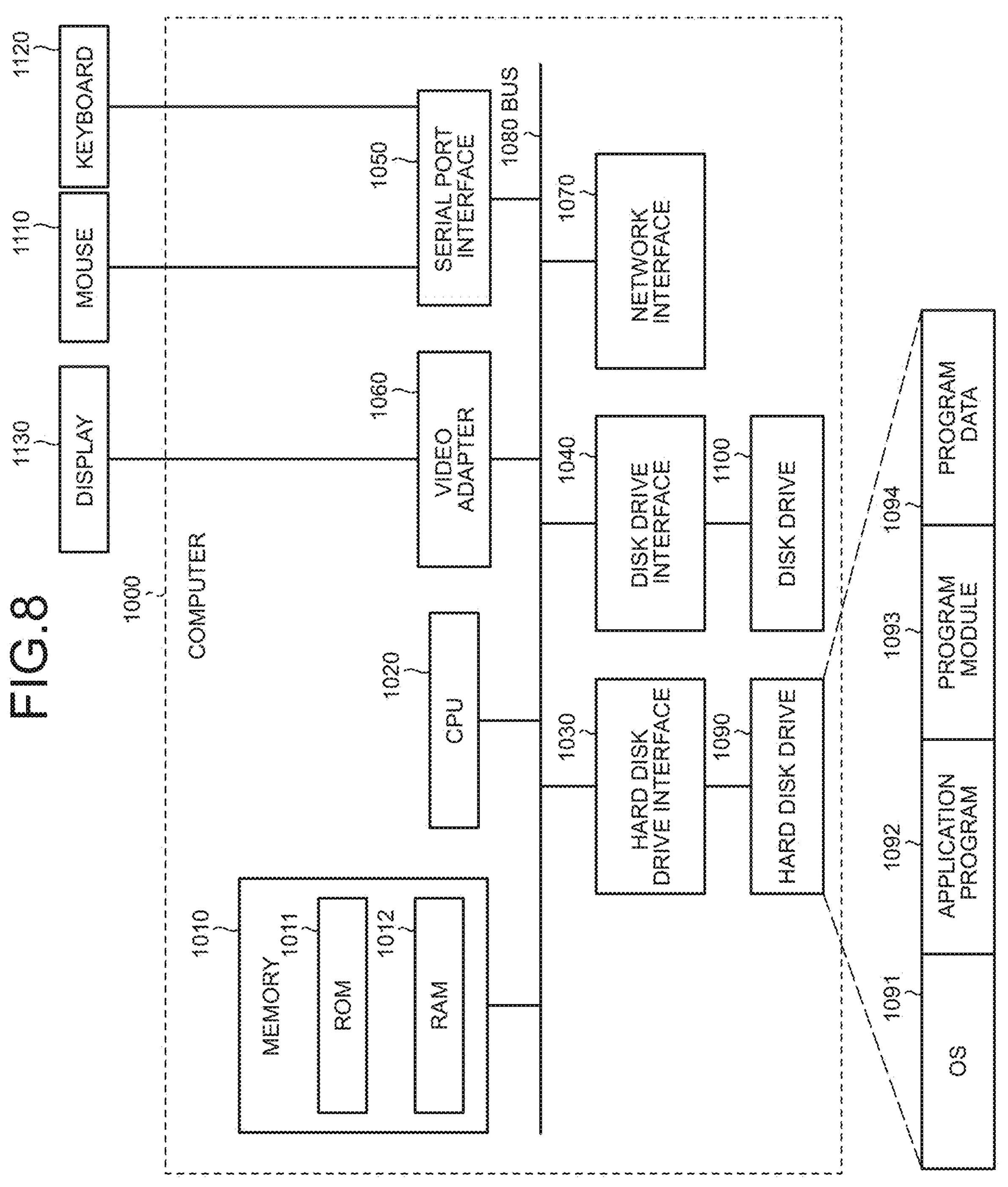
FIG. 8 is a diagram illustrating an example of a computer that executes an information processing program.

FIG. 8 is a diagram illustrating an example of a computer that executes an information processing program. As illustrated in FIG. 8, a computer 1000 includes, for example, memory 1010, a CPU 1020, a hard disk drive interface 1030, a disk drive interface 1040, a serial port interface 1050, a video adapter 1060, and a network interface 1070. These units are connected to each other via a bus 1080.

The memory 1010 includes read only memory (ROM) 1011 and RAM 1012. The ROM 1011 stores, for example, a boot program such as a Basic Input Output System (BIOS). The hard disk drive interface 1030 is connected to a hard disk drive 1090. The disk drive interface 1040 is connected to a disk drive 1100. For example, the disk drive 1100 is a drive into which a removable storage medium such as a magnetic disk or an optical disk is inserted. For example, the serial port interface 1050 is connected to a mouse 1110 and a keyboard 1120. For example, the video adapter 1060 is connected to a display 1130.

Here, as illustrated in FIG. 8, the hard disk drive 1090 stores an operating system (OS) 1091, an application program 1092, a program module 1093, and program data 1094, for example. Each table described in the above embodiment is stored in the hard disk drive 1090 or the memory 1010, for example.

Furthermore, the information processing program is stored in the hard disk drive 1090 as, for example, a program module describing commands to be executed by the computer 1000. Specifically, the program module 1093 describing each processing to be executed by the computer 1000 described in the above embodiment is stored in the hard disk drive 1090.

Furthermore, data used for information processing performed by the information processing program is stored as program data in the hard disk drive 1090, for example. The CPU 1020 reads the program module 1093 and the program data 1094 stored in the hard disk drive 1090 to the RAM 1012 as necessary, and executes each procedure described above.

The program module 1093 and the program data 1094 related to the information processing program are not limited to the form of being stored in the hard disk drive 1090, and may be stored in a removable storage medium and read by the CPU 1020 via the disk drive 1100 or the like, for example. Alternatively, the program module 1093 and the program data 1094 related to the control program may be stored in another computer connected via a network such as a LAN or a Wide Area Network (WAN) and read by the CPU 1020 via the network interface 1070.

Others

Various embodiments, described herein in detail with reference to the drawings as a plurality of embodiments, are merely examples and are not intended to limit the present invention to the plurality of embodiments. The features described herein may be implemented by various methods, including various modifications and improvements based on the knowledge of those skilled in the art.

In addition, the "terms such as a part (a module or a noun with suffix -er or suffix -or)" described above can be read as a unit, a means, a circuit, or the like. For example, a communication module, a control module, and a storage module can be replaced with a communication unit, a control unit, and a storage unit, respectively.

According to the present invention, quick incident handling and cost reduction can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:

processing circuitry configured to:

acquire a security log including information regarding unauthorized communication stored in an upper network device being a device constituting an overlay network, an authentication log stored in a cloud server, and a communication log stored in a lower network device being a device constituting an underlay network;

specify information such that, when the authentication log includes a connection source internet protocol (IP) address that does not exist in the communication log acquired and the security log includes information regarding an access not permitted to be used from the connection source IP address, the processing circuitry specifies the information regarding the access as unauthorized communication; and give an instruction to block the unauthorized communication specified.

2. The information processing apparatus according to claim 1, wherein the processing circuitry is further configured to:

compare a connection source IP address included in the security log with a connection source IP address included in the communication log, and determine whether the communication log includes log information in which a connection source IP address and the connection source IP address included in the security log are the same, compare the connection source IP address included in the security log with a connection source IP address included in the authentication log, and determine whether the authentication log includes log information in which a connection source IP address and the connection source IP address included in the security log are the same, and specify information such that, when having determined that the communication log includes no log information in which a connection source IP address and the connection source IP address included in the security log are the same, and having determined that the authentication log includes log information in which a connection source IP address and the connection source IP address included in the security log are the same, the processing circuitry specifies the log information of the connection source IP address included in the security log as unauthorized communication.

3. The information processing apparatus according to claim 1, wherein the processing circuitry is further configured to output information obtained by matching logs acquired, the logs being the security log, the authentication log, and the communication log.

4. The information processing apparatus according to claim 1, wherein the processing circuitry is further configured to give an instruction to block the unauthorized communication specified by using identification information included in the unauthorized communication.

5. An information processing method to be executed by a computer, the information processing method comprising:

acquiring a security log including information regarding unauthorized communication stored in an upper network device being a device constituting an overlay network, an authentication log stored in a cloud server, and a communication log stored in a lower network device being a device constituting an underlay network;

specifying information such that, when the authentication log includes a connection source internet protocol (IP) address that does not exist in the communication log acquired and the security log includes information regarding an access not permitted to be used from the connection source IP address, the specifying specifies the information regarding the access as unauthorized communication; and giving an instruction to block the unauthorized communication specified.

6. A non-transitory computer-readable recording medium storing therein an information processing program that causes a computer to execute a process comprising:

acquiring a security log including information regarding unauthorized communication stored in an upper network device being a device constituting an overlay network, an authentication log stored in a cloud server, and a communication log stored in a lower network device being a device constituting an underlay network;

specifying information such that, when the authentication log includes a connection source internet protocol (IP) address that does not exist in the communication log acquired and the security log includes information regarding an access not permitted to be used from the connection source IP address, the specifying specifies the information regarding the access as unauthorized communication; and giving an instruction to block the unauthorized communication specified.

* * * * *